Jan. 10, 1950   D. M. THREEWIT   2,493,841
TERMINAL CONNECTION FOR CONTROL CABLES
Filed Aug. 2, 1947
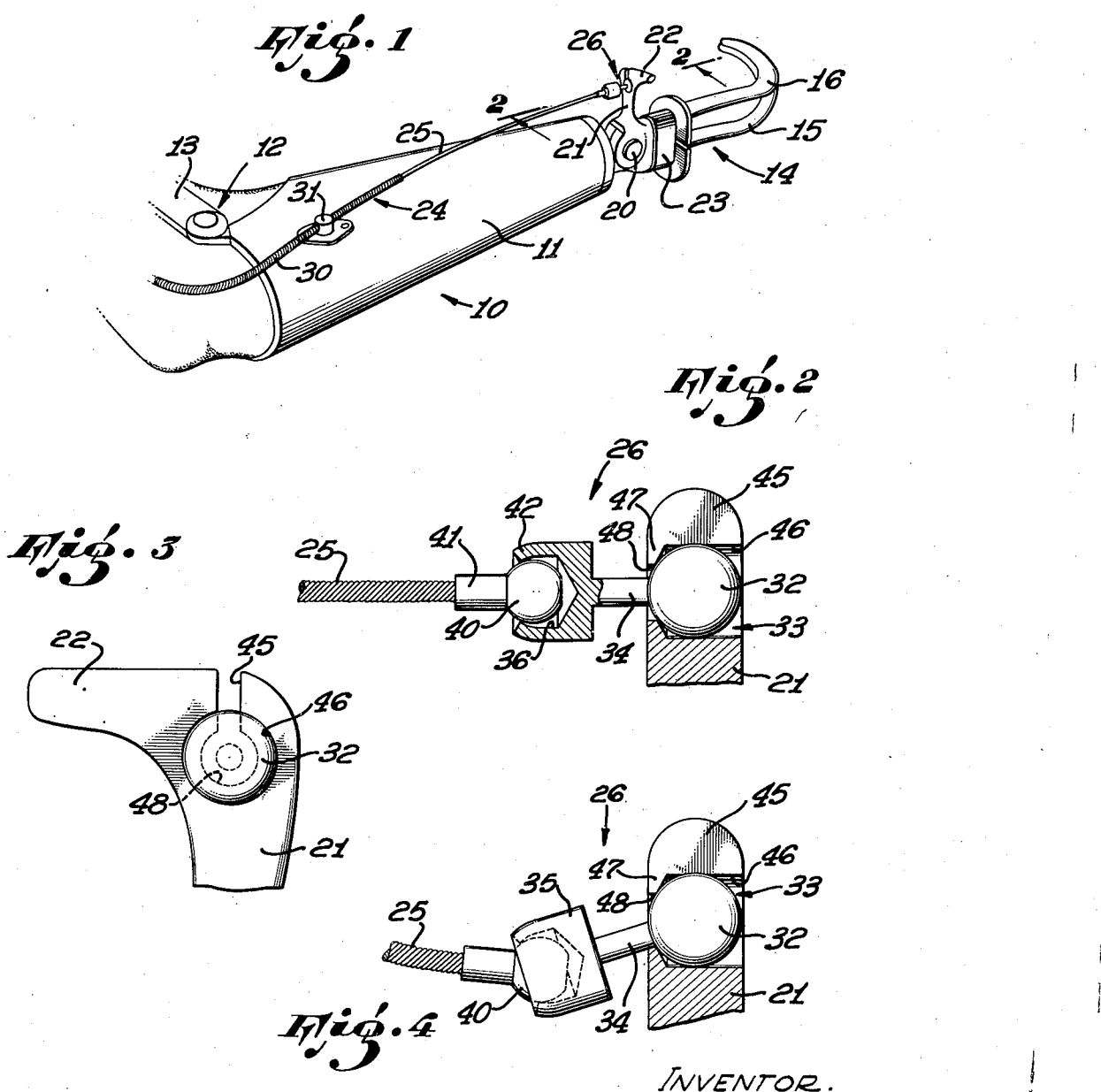
INVENTOR.
Donald. M. Threewit,
BY
ATTORNEY.

Patented Jan. 10, 1950

2,493,841

UNITED STATES PATENT OFFICE 2,493,841

TERMINAL CONNECTION FOR CONTROL CABLES

Donald M. Threewit, Inglewood, Calif., assignor to Northrop Aircraft, Inc., Hawthorne, Calif., a corporation of California Application August 2, 1947, Serial No. 765,750

4 Claims. (Cl. 287—87)

The present invention relates to terminal connections for flexible control cables, and more specifically to an articulated terminal connection designed particularly to overcome certain difficulties encountered with the use of Bowden cable controls in artificial arms to operate the conventional utility hook.

The utility hook in general use at the present time includes a stationary hook and a movable hook pivotally connected therewith, the latter having an operating lever projecting outwardly from its pivot end. The Bowden cable is connected at one end to the operating lever, and at the other end to a strap on the shoulder harness, so that a shrug of the shoulders produces a pull on the cable which is transmitted to the operating lever to open the hook against the tension of rubber bands or other spring means which are provided to close the hook. In order to obtain a firm grip of the hook on an article held therein, such rubber bands or spring means are designed to exert a considerable force on the hook when the latter is closed, and it is necessary, therefore, to use a fairly long operating lever so as to secure sufficient leverage to overcome this initial tension without excessive effort. The disadvantage of the long operating lever on the hook is that the tension-transmitting wire of the Bowden cable is held out a considerable distance from the forearm member of the arm, and whenever the arm is inadvertently bumped against an object such as a table, chair, or the like, the wire is pressed inwardly against the arm, bending it sharply at the point of connection with the operating lever. This is particularly true where the pressure is applied to the wire at a point closely adjacent the point of connection with the operating lever, which is usually the case. Sharp, localized bending also occurs in the wire at this point when the hook is rotated on its pronation-supination axis so that the plane of movement of the operating lever is turned at an angle to the line of pull of the wire.

The Bowden cable wire is usually provided on its end with a ball fitting which seats in a socket in the operating lever, and this ball-and-socket connection provides a degree of flexibility to accommodate a certain amount of disalignment or deflection of the wire from its normal line of pull. However, the ball fitting is limited by the edges of the socket to a relatively small amount of angular movement, and as a result there is still a considerable bending stress in the wire at its point of junction with the fitting, when the wire is deflected beyond the angular limits of the ball and socket connection. Repeated bending at this point causes the wire to break, and is a common cause of replacement of the Bowden cable control.

It is a primary object of the present invention, therefore, to provide a terminal connection for the control wire of a Bowden cable having a degree of flexibility considerably greater than that obtained with the conventional ball and socket connection, whereby bending stresses in the wire at its point of attachment to the operating lever of the hook are substantially eliminated.

Another object of the invention is to provide a terminal connection of the class described which is compact and rugged, as well as simple and inexpensive to manufacture.

The foregoing and other objects and advantages of the present invention will become apparent to those skilled in the art upon consideration of the following detailed description of the preferred embodiment thereof, reference being had to the accompanying drawings, in which:

Figure 1 is a perspective view of an artificial arm having a utility hook on the end thereof, with a Bowden cable control and a terminal connection embodying the principles of the invention;

Figure 2 is an enlarged sectional view of the terminal connection, taken along the line 2—2 in Figure 1;

Figure 3 is a front end elevational view of the operating lever for the hook, showing the ball member seated in the socket provided therein; and Figure 4 is a view similar to Figure 2, showing the manner in which the terminal connection bends when a pressure is applied to the control wire.

In the drawings, the reference numeral 10 designates an artificial arm comprising a forearm member 11 which is connected by an elbow hinge 12 to the saddle 13 of an upper arm cuff (not shown). Mounted on the outer end of the forearm member 11 and rotatable with respect thereto about the pronation-supination axis is a utility hook 14 of the type in general use at the present time. The hook 14 includes a stationary hook member 15 and a movable hook member 16, the latter being pivotally connected at 20 to the stationary member, whereby the movable hook 16 can be opened and closed with respect to member 15. Projecting radially outward from the pivot end of the movable hook member 16 is an operating lever 21, the outer end of which is provided with the usual angularly disposed thumb projection 22. The hook members 15, 16 are normally pulled together to the closed position shown in Figure 1 by rubber bands 23 which embrace the members a short distance out from the pivot 20, and the movable hook 16 is adapted to be opened against the tension of the rubber bands 23 by means of a Bowden cable control 24, the tension-transmitting wire 25 of which is connected to the outer end of the operating lever 21 by the terminal connection of the invention, designated generally at 26. The spring-wound, flexible conduit or housing 30 of the Bowden cable is attached to the arm member 11 by an anchor fitting 31, and to the upper arm cuff by a similar fitting. The upper end of the control wire 25 is connected by the usual hanger to a strap on the shoulder harness worn by the amputee, so that a shrug of the shoulders produces a pull in the wire 25 which is transmitted to the operating lever 21 to open the hook.

The terminal connection 26 includes a ball member 32 which is adapted to be seated in a socket 33 in the operating lever 21. Projecting from one side of the ball 32 is a slender, rigid shank or link 34, having a cylindrical enlargement 35 on its outer end, the diameter of which is substantially the same as the diameter of the ball. A socket 36 is formed in the outer end of the enlargement 35, and confined within this socket is another ball member 40 having an outwardly projecting cylindrical sleeve 41 which receives the end of the stranded control wire 25. The sleeve 41 is swaged onto the wire 25, so that its inner surface is meshed with the strands of the wire, forming a solid connection between them.

The ball 40 is somewhat smaller in diameter than the socket 36, and fits loosely therein. The sidewalls of the socket 36 are made initially straight and cylindrical, and are rolled over slightly at 42 after the ball has been inserted into the socket, so as to confine the ball.

To seat the ball member 32 in the socket 33, the shank 34 is inserted down through a narrow slot 45 in the operating lever 21, which opens into the socket 33. The socket 33 is formed by a cylindrical recess 46 having an inwardly projecting, annular shoulder 47 at its bottom end, against which the ball 32 bears. The inner edge of the shoulder 47 forms a circular opening 48 through which the shank 34 extends, and angular movement of the ball member in its socket is limited by the edges of the opening 48 which engage the shank 34.

The manner in which the terminal connection 26 accommodates deflection of the control wire 25 is illustrated in Figure 4. When the wire is pressed inwardly, the ball member 32, with its shank 34, swings down to the limit of its angular movement, as shown, and ball 40 turns in its socket to accommodate the disalignment of the wire with respect to the axis of the ball member 32, 34. The ball and socket joint 40, 36 thus prevents sharp bending of the wire at its point of connection with the ball member 32, and eliminates the breakage that has heretofore been so troublesome with Bowden cable controls for actuation of the utility hook.

While I have shown and described in considerable detail what I believe to be the preferred form of my invention, it is to be understood that such details are not restrictive, and that various changes may be made in the shape and arrangement of the several parts without departing from the scope of the invention, as defined in the appended claims.

I claim:

1. An articulated terminal connection for attaching a member comprising the control wire of a Bowden cable to another member comprising the operating lever of a utility hook, said connection comprising a substantially rigid link extending between said members, and means for connecting said link to each of said members for pivotal movement relative thereto.

2. An articulated terminal connection for attaching a member comprising the control wire of a Bowden cable to another member comprising the operating lever of a utility hook, said connection comprising a substantially rigid link extending between said members, and pivotal connections between said link and each of said members, one of the latter connections being a ball and socket joint.

3. An articulated terminal connection for attaching a member comprising the control wire of a Bowden cable to another member comprising the operating lever of a utility hook, said connection comprising a substantially rigid link extending between said members, and ball and socket joints for connecting said members to opposite ends of said link.

4. An articulated terminal connection for attaching a Bowden cable control wire to the operating lever of a utility hook, said lever having a socket formed in one side thereof, with a slot extending in from one edge of the lever to said socket, and an opening in the bottom of said socket extending through to the other side of the lever, said terminal connection comprising a ball member having a slender shank projecting from one end thereof, said shank being adapted to be inserted down through said slot to seat said ball member in said socket, with said shank disposed within said opening, an enlargement formed on the outer end of said shank and having a socket provided therein, and another ball member fixed to the end of said control wire and confined within said socket in said enlargement, said last named ball member and its associated socket providing a flexible joint to accommodate deflection of said control wire beyond the limits of angular movement of said first-named ball member within the socket on said operating lever.

DONALD M. THREEWIT.

REFERENCES CITED

The following references are of record in the file of this patent:

UNITED STATES PATENTS

| Number | Name | Date |
|---|---|---|
| 76,706 | Brevoort | Apr. 14, 1868 |
| 1,186,428 | Newman | June 6, 1916 |
| 1,460,697 | Bendlin | July 3, 1923 |
| 2,041,489 | Rosner | May 19, 1936 |

FOREIGN PATENTS

| Number | Country | Date |
|---|---|---|
| 6,175 | France | Sept. 21, 1906 |